(12) United States Patent
Sthoeger et al.

(10) Patent No.: US 8,332,557 B2
(45) Date of Patent: Dec. 11, 2012

(54) SYSTEM, APPARATUS, AND METHOD FOR BROADCASTING USB DATA STREAMS

(75) Inventors: Gilad Meir Sthoeger, Givat-Ada (IL); Eyal Skulsky, Haifa (IL)

(73) Assignee: QUALCOMM, Incorporated, San Diego, CA (US)

( * ) Notice: Subject to any disclaimer, the term of this patent is extended or adjusted under 35 U.S.C. 154(b) by 21 days.

(21) Appl. No.: 12/334,293

(22) Filed: Dec. 12, 2008

(65) Prior Publication Data
US 2010/0153600 A1 Jun. 17, 2010

(51) Int. Cl.
*G06F 13/00* (2006.01)
*G06F 3/00* (2006.01)

(52) U.S. Cl. ............................... 710/110; 710/9
(58) Field of Classification Search ............. 710/9, 110
See application file for complete search history.

(56) References Cited

U.S. PATENT DOCUMENTS

| | | | | |
|---|---|---|---|---|
| 5,761,601 A * | 6/1998 | Nemirofsky et al. | | 725/34 |
| 5,825,752 A * | 10/1998 | Fujimori et al. | | 370/260 |
| 5,974,486 A * | 10/1999 | Siddappa | | 710/53 |
| 6,157,975 A * | 12/2000 | Brief et al. | | 710/104 |
| 6,320,871 B1 | 11/2001 | Mizuguchi et al. | | 370/452 |
| 6,334,161 B1 * | 12/2001 | Suzuki et al. | | 710/29 |
| 6,567,876 B1 * | 5/2003 | Stufflebeam | | 710/303 |
| 6,678,464 B1 * | 1/2004 | Kawai et al. | | 386/252 |
| 6,721,332 B1 * | 4/2004 | McAlear | | 370/466 |
| 6,779,046 B1 * | 8/2004 | Osuga | | 710/14 |
| 6,976,105 B1 * | 12/2005 | Wright | | 710/104 |
| 7,213,138 B2 * | 5/2007 | Fukunaga et al. | | 710/110 |
| 7,424,568 B2 * | 9/2008 | Bae et al. | | 710/313 |
| 7,486,308 B1 * | 2/2009 | Kori et al. | | 348/143 |
| 7,533,191 B2 * | 5/2009 | Dunstan | | 710/3 |
| 7,636,797 B2 * | 12/2009 | Melton | | 710/9 |
| 7,644,211 B2 * | 1/2010 | Toebes et al. | | 710/106 |
| 7,912,084 B2 * | 3/2011 | Perrot et al. | | 370/466 |
| 2002/0041586 A1 * | 4/2002 | Hayashino et al. | | 370/338 |

(Continued)

FOREIGN PATENT DOCUMENTS

EP 1087571 A2 * 3/2001
(Continued)

OTHER PUBLICATIONS

"NN9308207: Seamless Inter-LAN Isochronous Communications", Aug. 1, 1993, IBM, IBM Technical Disclosure Bulletin, vol. 36, Iss. 8, pp. 207-214.*

(Continued)

*Primary Examiner* — Faisal M Zaman
(74) *Attorney, Agent, or Firm* — Ramin Mobarhan

(57) ABSTRACT

Exemplary embodiments are directed to broadcasting data on a USB system. The system includes a USB host and multiple broadcast-capable USB devices. Each USB device includes at least a default control endpoint for receiving control information and an isochronous sink endpoint for receiving a broadcast stream. The USB host programs a shared device address to an address register of each USB device such that all broadcast-capable USB devices programmed to that shared device address will accept the broadcast stream. One of the USB devices at the shared device address is set as a primary broadcast slave that will respond to non-isochronous transfers to the shared device address. All other USB devices with the shared device address are set to secondary slaves that ignore non-isochronous transfers to the shared device address.

29 Claims, 5 Drawing Sheets

U.S. PATENT DOCUMENTS

| | | | |
|---|---|---|---|
| 2002/0156952 A1 | 10/2002 | Shono | |
| 2003/0078063 A1* | 4/2003 | Legallais et al. | 455/509 |
| 2003/0202539 A1* | 10/2003 | Fukunaga et al. | 370/489 |
| 2004/0117498 A1* | 6/2004 | Hashimoto et al. | 709/230 |
| 2004/0181810 A1* | 9/2004 | Pelkey et al. | 725/116 |
| 2004/0246909 A1* | 12/2004 | Ahn | 370/252 |
| 2006/0018334 A1* | 1/2006 | Cho et al. | 370/432 |
| 2006/0127057 A1* | 6/2006 | Koyama | 386/112 |
| 2006/0224936 A1* | 10/2006 | Takamatsuya | 714/766 |
| 2007/0283037 A1* | 12/2007 | Burns et al. | 709/238 |
| 2007/0294443 A1* | 12/2007 | Berenbaum et al. | 710/104 |
| 2008/0181436 A1* | 7/2008 | Leach et al. | 381/123 |
| 2008/0276009 A1* | 11/2008 | Mesa et al. | 710/4 |

FOREIGN PATENT DOCUMENTS

| | | | |
|---|---|---|---|
| JP | 10210032 A | * | 8/1998 |
| JP | 2000261455 A | * | 9/2000 |
| JP | 2001077823 A | * | 3/2001 |
| JP | 2001320378 A | * | 11/2001 |
| JP | 2002016750 A | * | 1/2002 |
| JP | 2003309575 A | * | 10/2003 |

OTHER PUBLICATIONS

Bai Xiaoping; Wei Yuanfeng; , "Study on the signal detection and simulation of universal serial bus 2.0 IP core circuit system," SoutheastCon, 2007. Proceedings. IEEE , pp. 59-62, Mar. 22-25, 2007.*

Sunyong Lee; Teawan Kim; Jisung Byun; Yunmo Chung; Moonvin Song; , "Intergrated control system of multi-channel audio signals for serial transmission," Circuits and Systems, 2008. APCCAS 2008. IEEE Asia Pacific Conference on , pp. 1446-1449, Nov. 30, 2008-Dec. 3, 2008.*

Agere Systems, Inc., et al., "Wireless Universal Serial Bus Specification," Revision 1.0, dated May 12, 2005.

International Search Report and Written Opinion—PCT/US2010/024157—ISA/EPO—Aug. 29, 2011.

* cited by examiner

SYSTEM, APPARATUS, AND METHOD FOR BROADCASTING USB DATA STREAMS

BACKGROUND

The Universal Serial Bus (USB) is a standard peripheral interface for attaching computers to a wide variety of peripheral devices. These peripherals are generally referred to as functions, which may include hubs and devices, such as, keyboards, mice, cameras, monitors, modems, and many other peripherals.

Devices in a USB system connect to a USB host in a tiered star topology wherein each device connects to the USB host through one or more hubs. The USB system is a polled bus wherein a host computer includes a single USB controller that manages all communication on the bus and monitors the bus topology for changes due to devices being attached or removed.

Most bus transactions include three packets. The host controller sends a token packet describing the type and direction of the transaction, a device address, and an endpoint number. The USB device that is addressed recognizes its address from the token packet. Data is transferred either from the host to the addressed device or from the addressed device to the host based on the direction specified in the token packet. In most cases, the destination of the data responds with a handshake packet indicating a receipt status for the transferred data.

While the USB system supports multiple peripherals connected to the bus, the USB protocol is a point-to-point protocol. In other words, a single host can send data to a single uniquely addressed device at a time. Thus, data for the various devices are time multiplexed so that each device can receive or transmit data during its time slot.

The USB system generally defines frames that are one millisecond long, which may be subdivided into 125 microsecond micro-frames in high speed USB systems. Within the basic frame, the USB system may allocate different time slots to many or all of the devices on the bus. Each device has a unique address so the device knows that data transmitted is for it, or the host knows from which device the data is received.

There is a need for systems, apparatuses, and methods for broadcasting information on the USB bus to multiple USB devices at the same time.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Exemplary embodiments of the present invention are directed to broadcasting data to multiple USB devices in a USB system.

Figure 1:
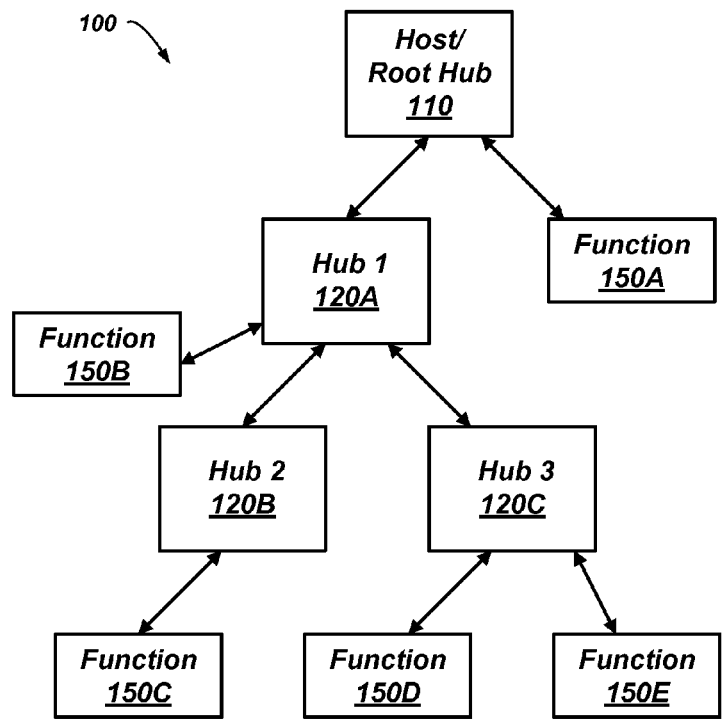
FIG. 1 shows a topology diagram for a USB system.

FIG. 1 shows a topology diagram 100 for a conventional USB system. A USB host 110 includes a root hub with multiple connection points. In FIG. 1, a first function 150A is connected at one connection point and a first hub 120A is connected to a second connection point. The first hub 120A includes multiple connection points. A second function 150B, a second hub 120B, and a third hub 120C are connected to the first hub 120A. The second hub 120B may include multiple connection points. A third function 150C is connected to the second hub 120B. The third hub 120C includes multiple connection points. A fourth function 150D and a fifth function 150 E are connected to the third hub 120C.

The hubs function as repeaters by sending data received on its upstream port to each of its downstream ports and sending information from one of its downstream ports to its upstream port. At any given time, only on function or the host should be placing information on the bus. Thus, as an example, the host may send information destined for the fifth function 150E. The information flows through the first hub 120A and the third hub 120C on its way to the fifth function 150E.

A USB function is generally a USB device that provides a capability to a device. As examples, a USB function may be a USB device, a USB hub, and the like.

USB hubs include status bits to report attachment and removal of USB devices on its ports. The USB host can query the USB hubs to determine the connection status for all devices in the topology and maintain a map of all the connected USB devices. When a USB device is removed from a port, the USB hub disables the port and reports the removal through the status bits. If the removed device is a USB hub, the host controller software will update the map to indicate that all USB devices that were connected to the removed USB hub are now disconnected.

USB data transfers occur between the host and specific endpoint on a USB device. Associations between the host and an endpoint are generally referred to as pipes. In general, data movement in one pipe is independent from data movement in other pipes. Thus, a given USB device may include multiple pipes and there may be a large number of pipes in the entire USB system.

The USB protocol supports four basic types of data transfer; control transfers, bulk data transfers, interrupt data transfers and isochronous data transfers. Control transfers, bulk transfers, and interrupt data transfers may be referred to herein collectively as non-isochronous communications.

Control transfers are used to configure a device when it is attached and manage other device specific tasks, such as, for example, controlling other endpoints on the device.

Bulk data transfers are used for data that are generally bursty and do not include significant constraints on bandwidth or latency requirements.

Interrupt data transfers are used for data that are periodic by nature and usually have low latency requirements, such as human perceptible data.

Isochronous data transfers use a pre-negotiated portion of the USB bandwidth for devices that require a substantially constant bandwidth and a low latency. Examples of such data are video and audio streaming data.

Non-isochronous communications include a receipt status response indicating whether data was received successfully. Thus, the non-isochronous communications include communications in both directions on the bus. In contrast, isochronous data transfers are one way and do not include a receipt status response. The isochronous data transfers may be from the host to a USB device or from the USB device to the host, but they are one-way transfers.

Broadcast, as used herein, is the transmission of isochronous data transfers from the host to a shared device address. Shared device address, as used herein, is an address that may be programmed into multiple broadcast-capable USB devices. Thus, a broadcast transmission may be received and used by multiple broadcast-capable USB devices all programmed to the same shared device address. All broadcast-capable USB devices sharing the same shared device address may be referred to herein as a broadcast group. Multiple broadcast groups may be operating at any given time in the USB system. In other words, multiple broadcast streams may be sent to multiple shared device addresses.

Since non-isochronous communications include replies, multiple devices programmed to a same shared device address would all present a response to a data transmission and collisions would occur on the bus. By using isochronous data transfers for broadcast information, the devices can share the same shared device address because there is no response to the isochronous data transfers. The timely delivery of isochronous data is ensured at the expense of possible errors in the data because typical error prevention mechanisms such as status responses and retries are not available.

Non-limiting examples of broadcast information are audio or video data to multiple recipients in a forum such as for lectures, training sessions, or in an airplane. Non-limiting examples of multiple broadcast streams are multiple movies running at once, or a lecture presented in multiple languages. Moreover, while isochronous data transfers are generally used for streaming data, there is no requirement that the data be streaming. Thus, broadcast information may be other types of information, such as, for example, sending the text of a book.

Figure 2:
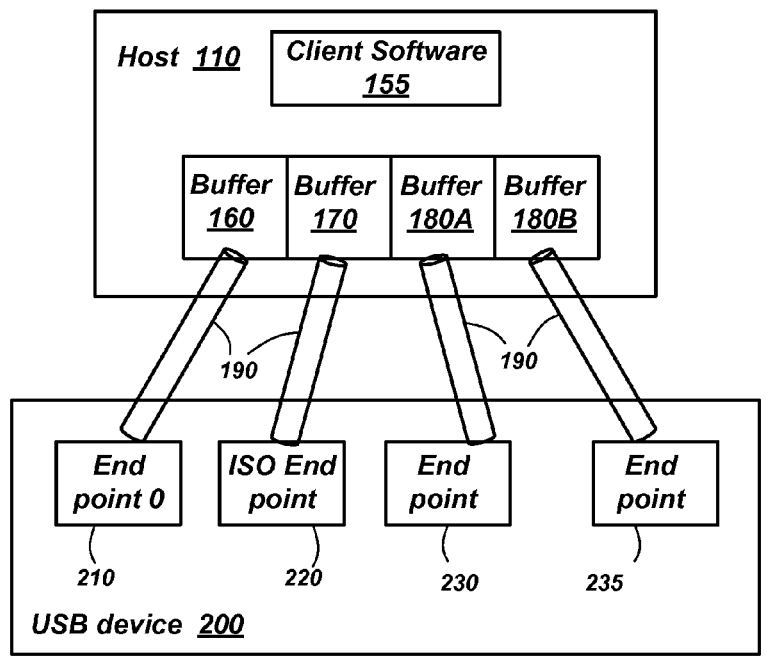
FIG. 2 shows a simplified block diagram of logical communication pipes in exemplary embodiments of the present invention.

FIG. 2 shows a simplified block diagram of logical communication pipes in exemplary embodiments of the present invention. A USB host 110 may include multiple buffers (160, 170, 180A, and 180B) feeding or receiving data for multiple pipes 190. Each pipe may be connected to a different endpoint (210, 220, 230A, and 230B) within a USB device 200. Client software 155 within the host receives information from or sends information to the various buffers (160, 170, 180A, and 180B). Endpoint 0 (210) is for control transfers as is explained below and ISO endpoint 220 is for receiving the broadcast stream as explained below.

A USB pipe 190 is a logical construct that represents the ability to move data between software on the USB host 110 via a memory buffer (160, 170, 180A, and 180B) to an endpoint (210, 220, 230 and 235) on the USB device 200. There are two types of pipe communication modes. Stream data moving through a pipe has no USB-defined structure. Message data moving through a pipe includes some type of structure defined by the USB architecture.

Figure 3:
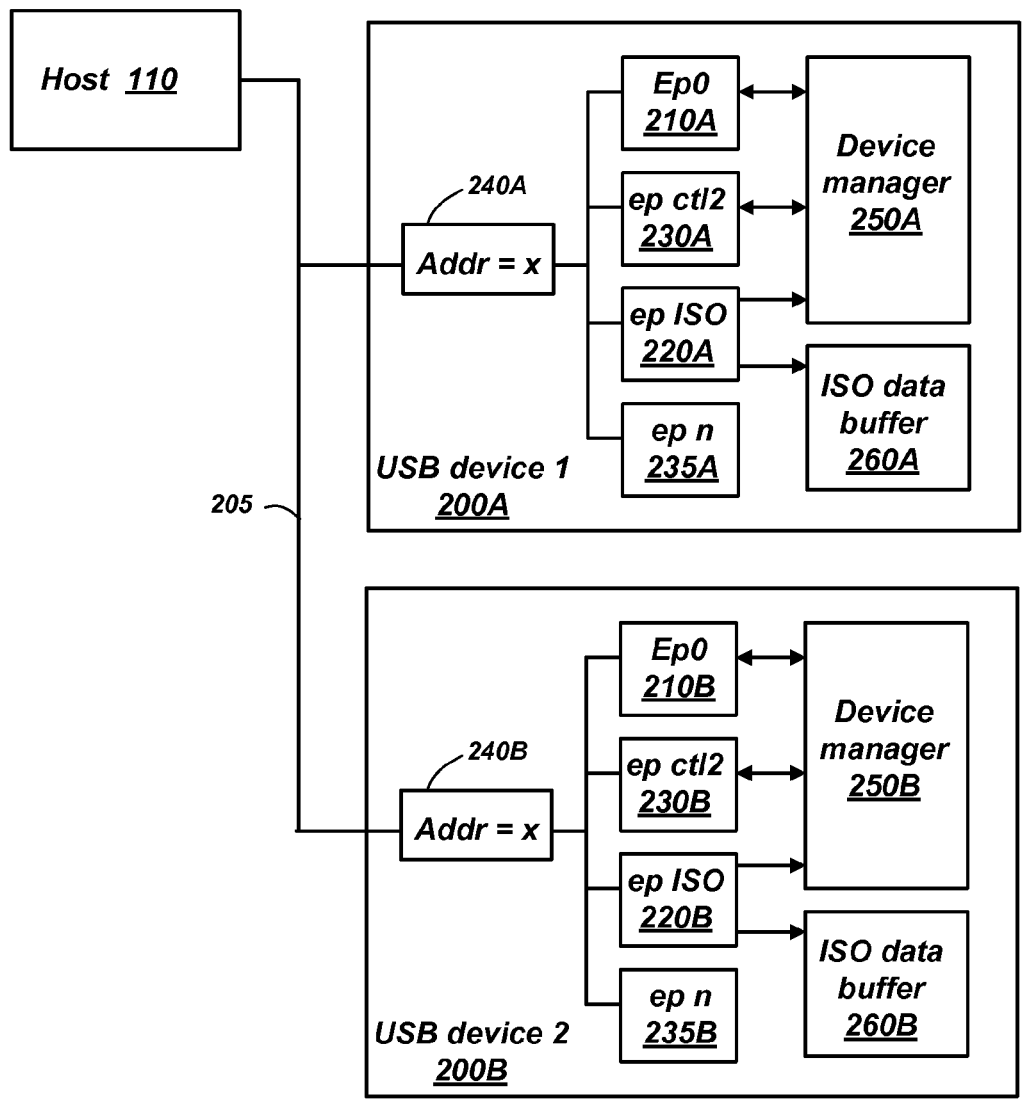
FIG. 3 shows a simplified block diagram of exemplary embodiments of the present invention.

FIG. 3 shows a simplified block diagram of exemplary embodiments of the present invention. FIG. 3 illustrates a USB system in a more functional representation, whereas FIG. 2 illustrates a USB system as a dataflow representation.

In FIG. 3, a USB host 100 is shown connected to a first USB device 200A and a second USB device 200B through a USB bus 205. Each USB device 200A and 200B may include similar components labeled with an appended "A" or "B," respectively. Thus, the components and devices may be referred to generically without the appended letter. A broadcast-capable USB device 200 includes an address register 240, an endpoint zero 210 (also referred to herein as a default control endpoint 210), and an isochronous sink endpoint 220. The broadcast-capable USB device 200 may also include other endpoints such as endpoint 230 and endpoint 235.

An endpoint is a uniquely identifiable portion of the USB device 200. Each USB device 200 includes a collection of independent endpoints. In general, each USB device 200 includes a unique address assigned by the system and contained in the address register 240. In addition, each endpoint within a USB device 200 is given a specific address. Furthermore, each endpoint is unidirectional with data flow direction toward the host or a dataflow direction toward the endpoint. Thus, the host recognizes a given endpoint as a combination of the device address, the endpoint address, and the flow direction.

All USB devices 200 are required to include a default control endpoint 210 for both input and output. The USB system software uses the default control endpoint 210 to initialize and configure the USB device 200 through a device manager 250. The default control endpoint 210 is assigned the endpoint address zero and supports control transfers.

In broadcast-capable USB devices 200, an isochronous sink endpoint 220 is included for receiving the broadcast information sent as isochronous data transfers and received by an isochronous data buffer 260. The isochronous data stream may include control commands decoded by the device manager 250, as is explained more fully below with reference to FIGS. 5 and 6.

Figure 4:
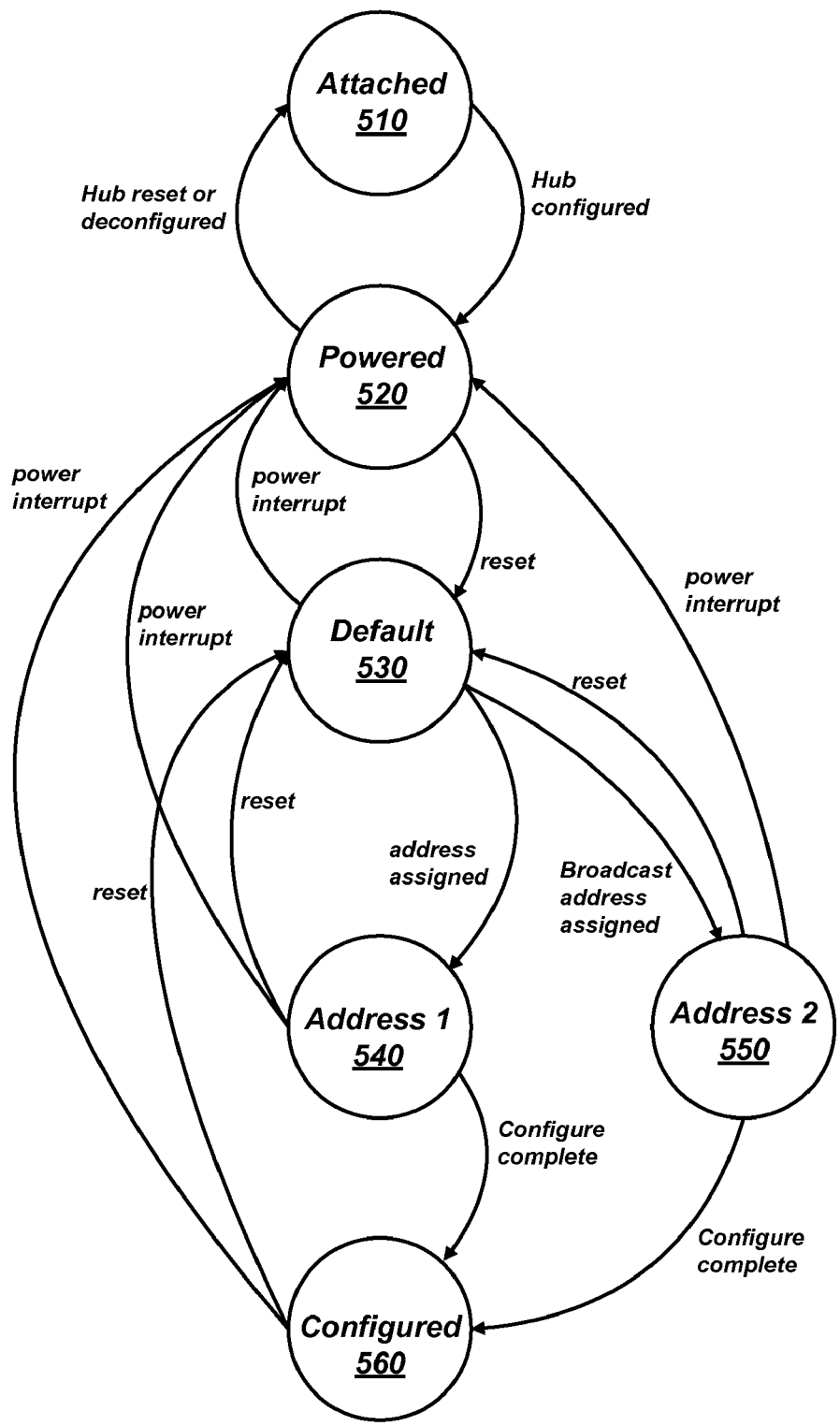
FIG. 4 shows a state diagram of an initialization process according to embodiments of the present invention

FIG. 4 shows a state diagram of an initialization process according to embodiments of the present invention. The initialization process is described with reference to both FIG. 3 and FIG. 4. When a USB device 200 is plugged in, it must go through this initialization process before it may be used. When attached, the USB device 200 begins in the attached state 510. If the hub to which the USB device 200 is attached is properly configured, the USB device 200 transitions to a powered state 520 where power may be applied to the USB device 200. The USB host 110 initiates a reset to the USB device 200 and the device transitions to a default state 530.

In the default state 530, the USB device 200 responds to the default address (e.g., zero). Thus, the default control endpoint 210 is accessible at the default address to enable reading of device descriptors and perform general setup of the USB device. If the USB host 110 determines that the USB device 200 is broadcast capable, and this device is the first to join a broadcast, the USB host 110 assigns the USB device 200 a unique address, which will be used as the shared device address when additional USB devices 200 join the broadcast group. With the unique address assigned, the USB device 200 transitions to a first address state 540. After all configuration is complete, the USB device 200 transition to a configured state 560 ready to receive a broadcast stream.

Returning to the default state 530, if the USB host 110 determines that the USB device 200 is broadcast capable, and this device is not the first to join a broadcast, the USB host 110 assigns the USB device 200 a shared device address for a specific broadcast group. With the shared device address assigned, the USB device 200 transitions to a second address state 550. After all configuration is complete, the USB device 200 transition to a configured state 560 ready to receive a broadcast stream.

A USB device 200 may receive a reset from the USB host 110. If a reset occurs from any of; the configured state 560, the first address state 540, and the second address state 550, the USB device 200 transitions back to the default state 530 to be reconfigured.

A USB device 200 may also have power interrupted. If a power interruption occurs from any of, the configured state 560, the first address state 540, the second address state 550, and the default state 530, the USB device 200 transitions back to the powered state 520 to be reset and reconfigured.

Once configured and assigned an address, the USB device 200 no longer responds to the default control address and instead responds to the programmed address. As stated earlier, broadcasts to the isochronous sink endpoint 220 may be received by multiple devices programmed to the same shared device address because isochronous data transfers do not require a response. However, other endpoints within devices sharing an address may cause collisions on the USB bus if more than one device attempts to respond to communications to that endpoint. As a result, when multiple USB devices 200 share an address, one USB device 200 is designated as a primary broadcast slave and the other USB devices 200 are defined as secondary broadcast slaves. Assignments and control of primary and secondary broadcast slaves are explained more fully below with reference to FIGS. 5 and 6.

Furthermore, if the USB device includes other endpoints or functions, which are independent of the broadcast stream, then the USB device may have two addresses, and thus logically be referred to by the host as two devices. A USB device that wants both broadcast abilities and non-isochronous endpoints (i.e., not broadcast related) will have a second unique address. On the other hand, a USB device that answers to a broadcast address and has no second unique address will not have any non-isochronous functions. Thus for a broadcast, having the single address is the minimum requirement.

Figure 5:
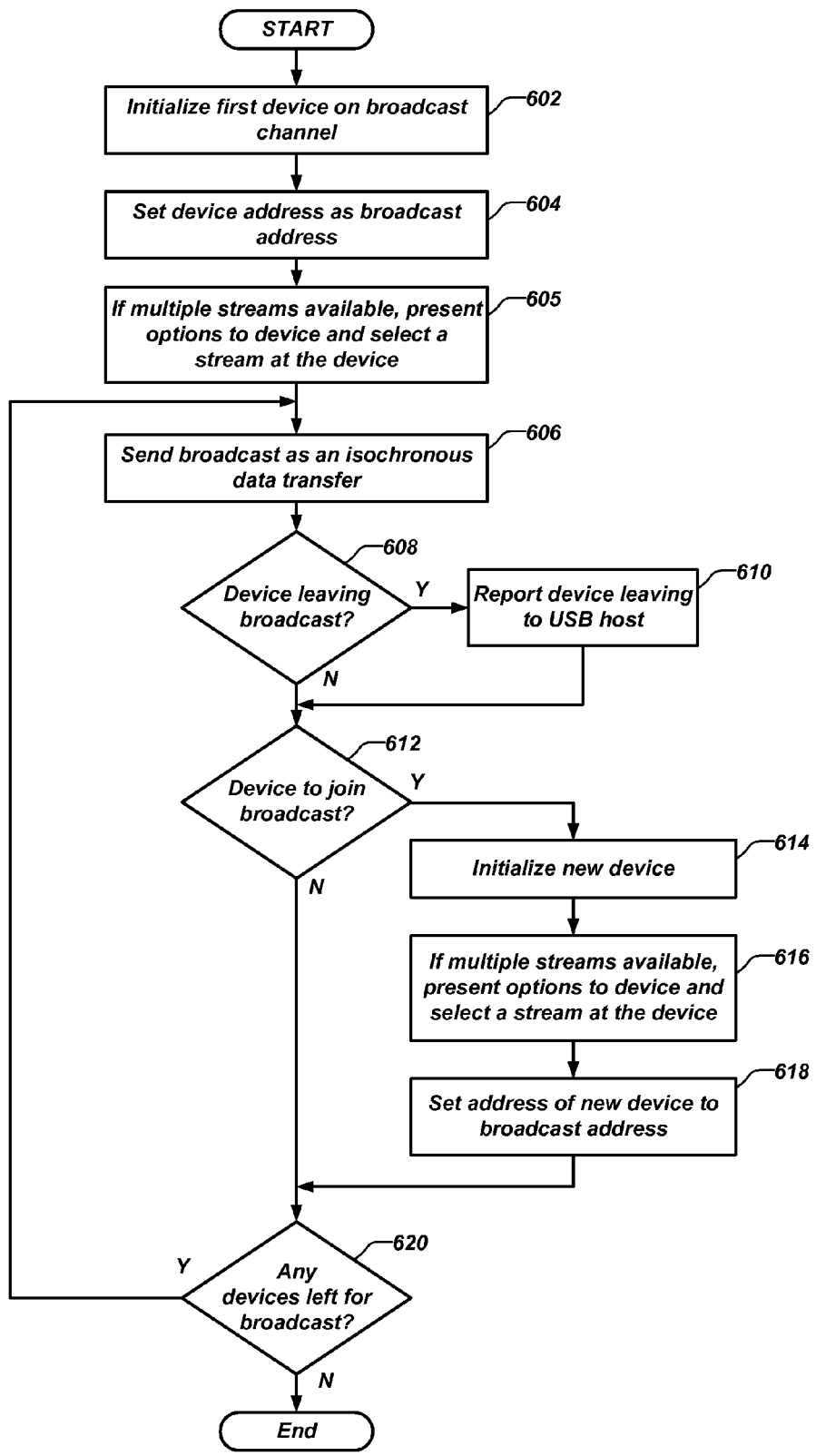
FIG. 5 is a simplified flow diagram of a broadcast process according to embodiments of the present invention.

FIG. 5 is a simplified flow diagram of a broadcast process according to embodiments of the present invention. The process begins at operation block 602 when a first USB device 200 wants to join a broadcast. At operation block 602, the first device is initialized. At operation block 604, a unique device address is set for this device. This unique device address will become the shared device address for additional devices that join the broadcast. The first device will be configured as the primary broadcast slave, meaning it will receive and process any non-isochronous communications sent to the shared address at endpoint zero 210 or other endpoints (e.g., 230 and 235 in FIG. 3) configured within the primary broadcast slave.

At operation block 605, the host software checks to see if multiple broadcasts are available as was explained above. If multiple broadcasts are available, the host software communicates availability of those broadcasts to the device and the device enables the user to select from the available broadcasts. This selection may be through a user interface on the device. The user interface may be relatively complex wherein the broadcasts are displayed to the user and the user may select the desired broadcast. However, the user interface may be relatively simple wherein a default broadcast is selected. The user may then press a button to sequence through available broadcasts. As a non-limiting example, this simple button press may reset the device and cause it to go through a new configuration process for the new broadcast.

At operation block 606, an isochronous data transfer is sent from the host as part of the broadcast stream.

Decision block 608 tests to see if a device is leaving the broadcast. As non-limiting examples, a device may leave the broadcast when it is unplugged from a port or when the simple user interface button is pressed. As stated earlier, a hub reports unplugs 610 to the host and the host can remove this device from a list of devices currently receiving a specific broadcast.

Decision block 612 tests to see if a device is joining a broadcast. If so, operation block 614 initializes the new device. Operation block 616 performs a broadcast stream selection as was discussed above with respect to operation block 605. Operation block 618 sets the device with the shared device address for the broadcast to be joined. In addition, the new device is configured as a secondary broadcast slave, meaning the device will receive the broadcast data on the isochronous sink endpoint, but will not respond on the USB bus to any other requests to the shared device address.

Decision block 620 tests to see if any devices are left on the broadcast. If not, the process exits. If devices are still on the broadcast, control transfers back to operation block 606 to send additional isochronous data transfers.

Figure 6:
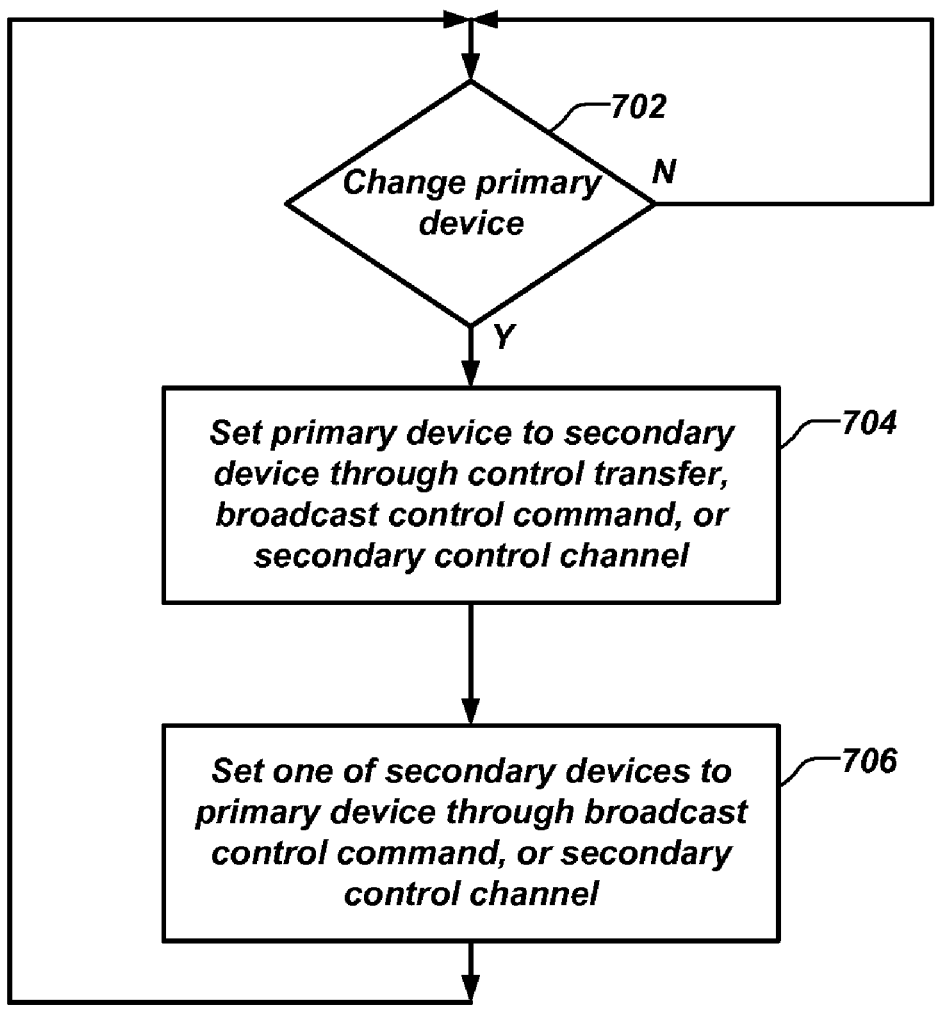
FIG. 6 is a simplified flow diagram of a process for changing a primary slave according to embodiments of the present invention.

FIG. 6 is a simplified flow diagram of a process for changing a primary broadcast slave according to embodiments of the present invention. The process of FIG. 6 is an ongoing background process that may execute anytime a change occurs or is desired for a given broadcast. As a non-limiting example, the primary broadcast slave may leave the broadcast. In this example, the host software may wish to assign a new primary broadcast slave. As another non-limiting example, the host software may wish to communicate with one of the secondary broadcast slaves.

Decision block 702 determines whether a primary broadcast slave change is desired. If not, the process loops. If a change is desired, operation block 704 sets the primary broadcast slave to a secondary broadcast slave if it is still participating in the broadcast. This change in status may be performed in a number of ways. Since this device is currently the primary broadcast slave, the change may be performed by a simple control transfer to endpoint zero.

As a non-limiting example of another means for performing the status change, a control command may be embedded in the broadcast data stream. Each device connected to the broadcast stream may monitor the broadcast data stream for these control commands addressed to it.

As another non-limiting example, additional endpoints (e.g. 230A or 230B in FIG. 3) may be configured to react to information sent to that endpoint and communicate the desire for a status change to the device manager 250 (FIG. 3). This additional endpoint 230 may also be referred to herein as a secondary control channel.

After the primary broadcast slave has been changed to a secondary broadcast slave, in operation block 706, the host device switches one of the secondary broadcast slaves to the primary broadcast slave. This status change may be performed with the control command embedded in the broadcast data stream or through the secondary control channel, as explained above. After setting the new primary broadcast slave, control transfers back to decision block 702.

This status change process may be repeated indefinitely in a manner such that the host can communicate control and status information to each of the secondary broadcast slaves by converting them to the primary broadcast slave one at a time.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A USB device, comprising:
    a default control endpoint for receiving control information from a USB host;
    an isochronous sink endpoint assigned a shared device address and for receiving a broadcast, isochronous stream from the USB host;
    an address register for receiving the shared device address from the USB host; and
    a device manager for:
        responding to the control information to indicate a capability to receive the broadcast stream;
        managing receipt of the broadcast stream as isochronous data transfers at the assigned shared device address;
        monitoring the broadcast, isochronous stream for a control command embedded therein and uniquely addressed to the USB device, the broadcast, isochronous stream received after being assigned the shared device address; and
        managing an ability to respond to additional control information from the USB host after the shared device address is received from the USB host.

2. The USB device of claim 1, wherein the device manager is further for managing the ability to respond by setting the USB device as a primary broadcast slave wherein the primary broadcast slave responds to the additional control information.

3. The USB device of claim 2, wherein setting the USB device as the primary broadcast slave comprises one of responding to the control information, responding to control commands embedded in the broadcast stream, and responding to information from an additional endpoint on the USB device configured as a secondary control channel.

4. The USB device of claim 2, further comprising at least one additional endpoint and wherein the device manager is further for managing an ability to communicate with the at least one additional endpoint when the USB device is the primary broadcast slave.

5. The USB device of claim 4, wherein the at least one additional endpoint responds to communications selected from the group consisting of isochronous data transfers, control transfers, bulk data transfers, and interrupt data transfers.

6. The USB device of claim 1, wherein the device manager is further for managing the ability to respond by setting the USB device as a secondary broadcast slave wherein the secondary broadcast slave ignores non-isochronous communications to the USB device.

7. The USB device of claim 6, wherein setting the USB device as the secondary broadcast slave comprises one of responding to the control information, responding to control commands embedded in the broadcast stream, and responding to information from an additional endpoint on the USB device configured as a secondary control channel.

8. The USB device of claim 6, further comprising at least one additional endpoint and wherein the device manager is further for disabling an ability to communicate with the at least one additional endpoint when the USB device is the secondary broadcast slave.

9. The USB device of claim 1, wherein the device manager is further for responding to the control information to indicate a selection of a specific broadcast stream from a plurality of broadcast streams indicated as available from the USB host.

10. A USB system, comprising:
a plurality of broadcast-capable USB devices, each device of the plurality comprising:
a default control endpoint for receiving control information;
an isochronous sink endpoint having a shared device address assigned thereto and for receiving a broadcast, isochronous stream;
an address register for receiving a shared device address; and
a device manager configured for monitoring the broadcast, isochronous stream for a control command embedded therein and uniquely addressed to the USB device, the broadcast, isochronous stream received after being assigned the shared device address; and
a USB host operably coupled to the plurality of broadcast-capable USB devices and for controlling the plurality of broadcast-capable USB devices by:
issuing control transfers to:
set one of the plurality of broadcast-capable USB devices as a primary broadcast slave;
set all the broadcast-capable USB devices of the plurality except the one as secondary broadcast slaves;
assign the shared device address to each device of the plurality of broadcast-capable USB devices;
issuing isochronous data transfers to the shared device address as the broadcast, isochronous stream.

11. The USB system of claim 10, further comprising at least one hub operably coupled in the USB system and for repeating the issuing control transfers and issuing the isochronous data transfers.

12. The USB system of claim 11, wherein each of the USB host and the at least one hub are further for detecting a removal of at least one device of the plurality of broadcast-capable USB devices, and the USB host is further for terminating the broadcast stream if there are no devices left in the plurality of broadcast-capable USB devices.

13. The USB system of claim 10, wherein each device of the plurality of broadcast-capable USB devices includes a device manager for managing an ability to respond to additional control information from the USB host after the shared device address is received from the USB host.

14. The USB system of claim 13, wherein the device manager of the primary broadcast slave responds to additional control transfers to the shared device address and the device manager of the secondary broadcast slaves ignores the additional control transfers to the shared device address.

15. The USB system of claim 13, wherein the device manager of each device of the plurality of broadcast-capable USB devices is further for responding to control commands embedded in the broadcast stream, and responding to information from an additional endpoint on the one device configured as a secondary control channel.

16. A method, comprising:
detecting a broadcast-capable USB device on a USB topology;
setting the broadcast-capable USB device to a broadcast mode for receiving a broadcast, isochronous stream as isochronous data transfers;
setting an address of an isochronous sink endpoint of the broadcast-capable USB device to a shared device address;
detecting at least one additional broadcast-capable USB device on the USB topology;
setting the at least one additional broadcast-capable USB device to the broadcast mode;
setting an address of the at least one additional broadcast-capable USB device to the shared device address;
communicating the broadcast, isochronous stream to the shared device address; and
communicating control information embedded within the broadcast, isochronous stream and uniquely addressed to at least one of the broadcast-capable USB devices assigned the shared device address.

17. The method of claim 16, further comprising repeating the acts of claim 16 by conveying the acts through at least one hub connected in the USB topology.

18. The method of claim 16, wherein a broadcast group consists of the broadcast-capable USB device and the at least one additional broadcast-capable USB device, the method further comprising:
setting one device of the broadcast group as a primary broadcast slave enabled to respond to control transfers from a USB host; and
setting all other devices of the broadcast group as secondary broadcast slaves disabled from responding to the control transfers from the USB host.

19. The method of claim 18, wherein setting one device of the broadcast group as the primary broadcast slave comprises one of responding to control information from a control transfer, responding to control commands embedded in the broadcast stream, and responding to an additional endpoint on the one device configured as a secondary control channel.

20. The method of claim 18, wherein setting all other devices of the broadcast group as the secondary broadcast slaves comprises one of responding to control information from a control transfer, responding to control commands embedded in the broadcast stream, and responding to an additional endpoint on the one device configured as a secondary control channel.

21. The method of claim 16, wherein a broadcast group consists of the broadcast-capable USB device and the at least one additional broadcast-capable USB device, the method further comprising:
detecting a removal of at least one device of the broadcast group; and
terminating the broadcast stream if there are no devices left in the broadcast group.

22. The method of claim 16, further comprising indicating a selection of a specific broadcast stream from a plurality of broadcast streams designated as available from a USB host.

23. A USB system, comprising:
- means for detecting a broadcast-capable USB device on a USB topology;
- means for setting the broadcast-capable USB device to a broadcast mode for receiving a broadcast, isochronous stream as isochronous data transfers;
- means for setting an address of an isochronous sink endpoint of the broadcast-capable USB device to a shared device address;
- means for detecting at least one additional broadcast-capable USB device on the USB topology;
- means for setting the at least one additional broadcast-capable USB device to the broadcast mode;
- means for setting an address of the at least one additional broadcast-capable USB device to the shared device address;
- means for communicating the broadcast, isochronous stream to the shared device address; and
- means for communicating control information embedded within the broadcast, isochronous stream and uniquely addressed to at least one of the broadcast-capable USB devices assigned the shared device address.

24. The system of claim 23, further comprising means for repeating the acts of claim 23 by performing the acts through at least one hub connected in the USB topology.

25. The USB system of claim 23, wherein a broadcast group consists of the broadcast-capable USB device and the at least one additional broadcast-capable USB device, the system further comprising:
- means for setting one device of the broadcast group as a primary broadcast slave enabled to respond to control transfers from a USB host; and
- means for setting all other devices of the broadcast group as secondary broadcast slaves disabled from responding to the control transfers from the USB host.

26. The USB system of claim 25, wherein the means for setting one device of the broadcast group as the primary broadcast slave comprises means for performing one of responding to control information from a control transfer, responding to control commands embedded in the broadcast stream, and responding to an additional endpoint on the one device configured as a secondary control channel.

27. The USB system of claim 25, wherein the means for setting all other devices of the broadcast group as the secondary broadcast slaves comprises means for performing one of responding to control information from a control transfer, responding to control commands embedded in the broadcast stream, and responding to information from an additional endpoint on the one device configured as a secondary control channel.

28. The USB system of claim 23, wherein a broadcast group consists of the broadcast-capable USB device and the at least one additional broadcast-capable USB device, the system further comprising:
- means for detecting a removal of at least one device of the broadcast group; and
- means for terminating the broadcast stream if there are no devices left in the broadcast group.

29. The method of claim 23, further comprising means for indicating a selection of a specific broadcast stream from a plurality of broadcast streams designated as available from a USB host.

* * * * *